United States Patent
Norrman et al.

(10) Patent No.: US 10,931,644 B2
(45) Date of Patent: *Feb. 23, 2021

(54) METHODS, NETWORK NODES, MOBILE ENTITY, COMPUTER PROGRAMS AND COMPUTER PROGRAM PRODUCTS FOR PROTECTING PRIVACY OF A MOBILE ENTITY

(71) Applicant: Telefonaktiebolaget LM Ericsson (publ), Stockholm (SE)

(72) Inventors: Karl Norrman, Stockholm (SE); Yi Cheng, Sundbyberg (SE); John Mattsson, Täby (SE); Mats Näslund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 446 days.

This patent is subject to a terminal disclaimer.

(21) Appl. No.: 15/737,816

(22) PCT Filed: Jun. 23, 2015

(86) PCT No.: PCT/SE2015/050728
§ 371 (c)(1),
(2) Date: Dec. 19, 2017

(87) PCT Pub. No.: WO2016/209126
PCT Pub. Date: Dec. 29, 2016

(65) Prior Publication Data
US 2019/0007376 A1   Jan. 3, 2019

(51) Int. Cl.
*H04L 29/06* (2006.01)
*H04W 8/26* (2009.01)
(Continued)

(52) U.S. Cl.
CPC ........ *H04L 63/0414* (2013.01); *H04L 9/0643* (2013.01); *H04L 9/3271* (2013.01);
(Continued)

(58) Field of Classification Search
CPC .. H04L 63/0414; H04L 9/0643; H04L 9/3271
See application file for complete search history.

(56) References Cited

U.S. PATENT DOCUMENTS

| | | | | |
|---|---|---|---|---|
| 5,729,537 A | * | 3/1998 | Billstrom | H04L 63/0414 370/329 |
| 2006/0141987 A1 | * | 6/2006 | De Groot | H04L 63/0414 455/411 |

(Continued)

FOREIGN PATENT DOCUMENTS

| | | |
|---|---|---|
| EP | 2161963 A1 | 3/2010 |
| WO | WO 2009/146729 A1 | 12/2009 |
| WO | WO 2010/012318 A1 | 2/2010 |

OTHER PUBLICATIONS

International Search Report and Written Opinion of the International Searching Authority, PCT/SE2015/050728, dated Feb. 8, 2016, 13 pages.

(Continued)

*Primary Examiner* — Vance M Little
(74) *Attorney, Agent, or Firm* — Sage Patent Group

(57) ABSTRACT

A method for a first network node may protect confidentiality of a first identifier associated by the first network node with a subscription used by a mobile entity. The communications network comprises a home network of the mobile entity and a serving network serving the mobile entity. The first network node, which is part of the home network may: receive, from a second network node which is part of the serving network, a first request for authentication information for the mobile entity, the first request comprising the first identifier; generate a first pseudonym associated with (Continued)

the first identifier; create a link between the first pseudonym and the first identifier; and send, to the second network node, the first pseudonym in response to the first request for authentication information for use as an identifier for the mobile entity in the serving network. A method for a second network node is also provided.

20 Claims, 7 Drawing Sheets

(51) Int. Cl.
    *H04W 12/02*     (2009.01)
    *H04W 12/06*     (2021.01)
    *H04L 9/32*     (2006.01)
    *H04L 9/06*     (2006.01)
    *H04W 12/00*     (2021.01)

(52) U.S. Cl.
    CPC .......... *H04L 63/0876* (2013.01); *H04W 8/26* (2013.01); *H04W 12/02* (2013.01); *H04W 12/06* (2013.01); *H04L 2209/42* (2013.01); *H04L 2209/80* (2013.01); *H04W 12/00518* (2019.01)

(56) References Cited

U.S. PATENT DOCUMENTS

2008/0130898 A1*   6/2008   Holtmanns ......... H04L 63/0414
                                                      380/278
2014/0349614 A1*   11/2014   Starsinic ............... H04W 12/04
                                                      455/411

OTHER PUBLICATIONS

3GPP TS 33.220, V12.3.0 (Jun. 2014), 3rd Generation Partnership Project, Technical Specification Group Services and System Aspects, Generic Authentication Architecture (GAA); Generic Bootstrapping Architecture (GBA) (Release 12), 92 pages.
"IMSI Catching Attack Mitigation," (S3-060646) 3GPP TSG SA WG3 #45, Agenda Item SAE/LTE Security, Nokia, Dulles, US, Oct. 31-Nov. 3, 2006, 2 pages.
"User Identity Protection in SAE/LTE," (S3-070682) 3GPP TSG SA WG3 Security—S3#49, Agenda Item 6.14, Huawei, Munich, Germany, Oct. 8-12, 2007, 2 pages.

* cited by examiner

METHODS, NETWORK NODES, MOBILE ENTITY, COMPUTER PROGRAMS AND COMPUTER PROGRAM PRODUCTS FOR PROTECTING PRIVACY OF A MOBILE ENTITY

CROSS REFERENCE TO RELATED APPLICATIONS

This application is a 35 U.S.C. § 371 national stage application of PCT International Application No. PCT/SE2015/050728 filed on Jun. 23, 2015, the disclosure and content of which is incorporated by reference herein in its entirety.

TECHNICAL FIELD

The technology disclosed herein relates generally to the field of communications systems and in particular to methods and means for protecting privacy of subscribers in such systems.

BACKGROUND

In wireless communication there is inherently a risk of eavesdropping, i.e. that data sent from or to a user may be intercepted and used by an unintended user. Locations or traveling routes of a user in a mobile network could, for instance, be tracked by tracing to which cells the user is connected or through which cells the user is travelling, resulting in privacy infringement.

It is known that the technical implementation of many trust models, including those used in mobile networks, may leave open the possibility for various types of attacks, from external hackers as well as malicious insiders. If, for example, a network operator's trust for its employees is betrayed, security is typically lost. Entities with access to interconnect networks, interconnecting home and visited networks, are often authorized to perform very sensitive operations on other entities and security thereof is therefore of high importance.

In recent years there has been much publicity around cases wherein attacks have been performed on networks supporting the operation of mobile communications systems. For example, attackers have quite easily obtained legal or illegal access to signaling system 7 (SS7) networks, and by using that access have been able to elicit privacy sensitive information such as subscribers' precise geographical location. However, attacks are not only performed via such gray-area access to interconnecting networks. There have also been various cases of actively compromising nodes in the mobile network core and vendors development environments.

Another type of attack comprises obtaining the identity of a mobile subscriber, e.g. International Mobile Subscriber Identity (IMSI) catchers. The IMSI catcher, in the simplest form, requests the long-term subscriber identity from a mobile terminal. Since this is a valid request in normal operations, the mobile terminal replies with its long-term subscriber identity according to standardized protocols. The IMSI catchers can be used e.g. to keep track of who is moving in a certain area. In addition, more advanced IMSI catchers can eavesdrop on the traffic to and from the mobile terminal. Cellular standards do not address threats from such attack-devices, and it is a non-trivial issue since the IMSI requests may occur when there is no security context available to cryptographically protect the request.

A current solution for protecting the privacy of the subscriber's identity is based on a serving network assigning a temporary identity to the mobile terminal at regular intervals. The long-term identity is used only as a fallback mechanism or when a temporary identity has not yet been assigned. The long-term identity may be the mentioned IMSI and the temporary identity is then the Temporary Mobile Subscriber Identity (TMSI). There are also other temporary identifiers used, e.g. various Radio Network Temporary Identifiers (RNTIs) used locally for radio access specific parts, e.g. for identifying radio channels.

To avoid a lock-out of a mobile terminal when errors occur, e.g. when the serving network or the mobile terminal has lost the TMSI, the above mentioned fallback mechanism is provided, wherein the mobile terminal falls back to using the IMSI whenever the serving network so requests. This fallback is what the mentioned IMSI-catchers use to obtain the IMSI from the mobile terminals. The current way of protecting privacy does hence not provide any protection against an active attacker on the air-interface, claiming to be a legitimate network that has lost the temporary identity. Neither is there any protection against passive eavesdroppers who happen to be present when (legitimate or illegitimate) IMSI requests are made.

At the initial phases of Universal Mobile Telecommunications System (UMTS) and Long Term Evolution (LTE) standardization, some enhanced long-term identity protection mechanisms were discussed. The three options that were discussed included encrypting IMSI by a public key of the network, encrypting IMSI using a shared group key, and authenticating IMSI requests by the network.

The option of encrypting IMSI by a public key of the network was, eventually, dismissed due to the complexity and limited processing power for public key operations of mobile terminals that existed at the time. Further, this option may not protect against malicious insiders, e.g., from a roaming partner who could see a business case in extracting and selling IMSIs and the corresponding location of mobile terminals.

The option of encrypting IMSI using a shared group key does not prevent other mobile terminals, who also know the group key, from obtaining the IMSI.

The third option, the authenticating IMSI requests by the network does not protect against passive (eavesdropping) attackers and requires complex key management associated with the serving network, e.g. a public key infrastructure (PKI).

Further, since the trust model assumes that anyone with access to the interconnecting network is trusted to behave well, the nodes in the serving network will supply sensitive information such as the precise location of a subscriber when requested to do so by another node connected to the interconnecting network. As is evident from the multiple occurrences of various attacks, this trust model does no longer match reality. The privacy protection of the subscriber identity, being designed under the assumption that the trust model holds, is therefore ineffective.

The above mentioned problems occur also for other communications system. For example, systems using the Extensible Authentication Protocol (EAP) have various mechanisms to handle identifiers. As an example, when using the EAP-Authentication and Key Agreement (AKA) mechanism, there are occasions where the network issues identity requests that the terminal must accept and respond to. While also here a scheme of temporary identities is supported, there are occasions during normal operation when there is no option but to disclose the long term identity.

In the specific case of EAP-AKA, which is used in some Wireless Local Area Networks (WLAN), this identity will again reveal the IMSI. In other cases, long term identities may be disclosed in the form of user names encoded in "Issued-to" fields of public key certificates, etc.

From the above it is clear that there is a need for improvements in view of handling of identifiers in order to prevent identification of subscribers and to protect their privacy.

SUMMARY

An objective of the present disclosure is to address and solve or at least alleviate at least one of the above mentioned problems.

The objective is according to an aspect achieved by a method for a first network node (e.g. a home subscriber server, HSS) of protecting confidentiality of a first identifier associated by the first network node with a subscription used by a mobile entity in a communications network. The communications network comprises a home network of the mobile entity and a serving network serving the mobile entity. The method comprises the following steps performed by a first network node which is part of the home network: receiving, from a second network node, which is part of the serving network, a first request for authentication information for the mobile entity, the first request comprising the first identifier, generating a first pseudonym associated with the first identifier, creating a link between the first pseudonym and the first identifier, and sending, to the second network node, the first pseudonym in response to the first request for authentication information for use as an identifier for the mobile entity in the serving network.

An advantage of the method is that e.g. IMSI catchers are rendered less useful, since they will only be able to catch a pseudonym, which in addition may be changed often. Further, nodes of the serving network will become less attractive as attack targets, since the IMSI will not be available to them. Still further, the method reduces the problem of almost any entity with access to an interconnecting network being able to request the precise location of a subscriber.

The objective is according to an aspect achieved by a computer program for a first network node for protecting confidentiality of a first identifier associated by the first network node with a subscription used by a mobile entity. The computer program comprises computer program code, which, when executed on at least one processor of the first network node causes the first network node to perform the method as above.

The objective is according to an aspect achieved by a computer program product comprising a computer program as above and a computer readable means on which the computer program is stored.

The objective is according to an aspect achieved by a method in a first network node for protecting confidentiality of a first identifier associated by the first network node with a subscription used by a mobile entity in a communications network. The communications network comprises a home network of the mobile entity and a serving network serving the mobile entity. The first network node is part of the home network and is configured to: receive, from a second network node, which is part of the serving network, a first request for authentication information for the mobile entity, the first request comprising the first identifier, generate a first pseudonym associated with the first identifier, create a link between the first pseudonym and the first identifier, and send, to the second network node, the first pseudonym in response to the first request for authentication information for use as an identifier for the mobile entity in the serving network.

The objective is according to an aspect achieved by a method for a second network node (e.g. a mobility management entity, MME) of protecting confidentiality of a first identifier associated by a first network node with a subscription used by a mobile entity in a communications network. The communications network comprises a home network of the mobile entity and a serving network serving the mobile entity. The method comprises the following steps, performed by the second network node, which is part of the serving network: sending, to the first network node, which is part of the home network, a first request for authentication information for the mobile entity, the first request comprising the first identifier, receiving, from the first network node, a first pseudonym associated with the first identifier in response to the first request, creating a link between a temporary identifier of the mobile entity and the first pseudonym, and using the first pseudonym as identifier of the mobile entity.

The objective is according to an aspect achieved by a computer program for a second network node for protecting confidentiality of a first identifier associated by a first network node with a subscription used by a mobile entity. The computer program comprises computer program code, which, when executed on at least one processor of the second network node causes the second network node to perform the method as above.

The objective is according to an aspect achieved by a computer program product comprising a computer program as above and a computer readable means on which the computer program is stored.

The objective is according to an aspect achieved by a second network node for protecting confidentiality of a first identifier associated by a first network node (5, 15) with a subscription used by a mobile entity in a communications network. The communications network comprises a home network of the mobile entity and a serving network serving the mobile entity. The second network node is part of the serving network and is configured to: send, to a first network node, which is part of the home network, a first request for authentication information for the mobile entity, the first request comprising the first identifier, receive, from the first network node, a first pseudonym associated with the first identifier in response to the first request, create a link between a temporary identifier of the mobile entity and the first pseudonym, and use the first pseudonym as identifier of the mobile entity.

The objective is according to an aspect achieved by a method for a mobile entity of a communications network of protecting confidentiality of a first identifier associated with a subscription used by the mobile entity. The communications network comprises a home network of the mobile entity and a serving network serving the mobile entity. The method comprises sending to a second network node, which is part of the serving network, an attachment request, the attachment request comprising a first pseudonym previously generated for the mobile entity by a first network node, which is part of the home network, or the first identifier in encrypted format, encrypted in the mobile entity, and receiving, from the second network node, a second pseudonym associated with the mobile entity in response to the attachment request.

The objective is according to an aspect achieved by a computer program for a mobile entity of a communications network for protecting confidentiality of a first identifier associated with a subscription used by the mobile entity. The computer program comprises computer program code, which, when executed on at least one processor of the mobile entity causes the mobile entity to perform the method as above.

The objective is according to an aspect achieved by a computer program product comprising a computer program as above and a computer readable means on which the computer program is stored.

The objective is according to an aspect achieved by a mobile entity of a communications network of protecting confidentiality of a first identifier associated with a subscription used by the mobile entity. The communications network comprises a home network of the mobile entity and a serving network serving the mobile entity. The mobile entity is configured to: send to a second network node, which is part of the serving network, an attachment request, the attachment request comprising a first pseudonym previously generated for the mobile entity by a first network node, which is part of the home network, or the first identifier in encrypted format, encrypted in the mobile entity, and receive, from the second network node, a second pseudonym associated with the mobile entity in response to the attachment request.

Further features and advantages of the embodiments of the present teachings will become clear upon reading the following description and the accompanying drawings.

DETAILED DESCRIPTION

Figure 1:
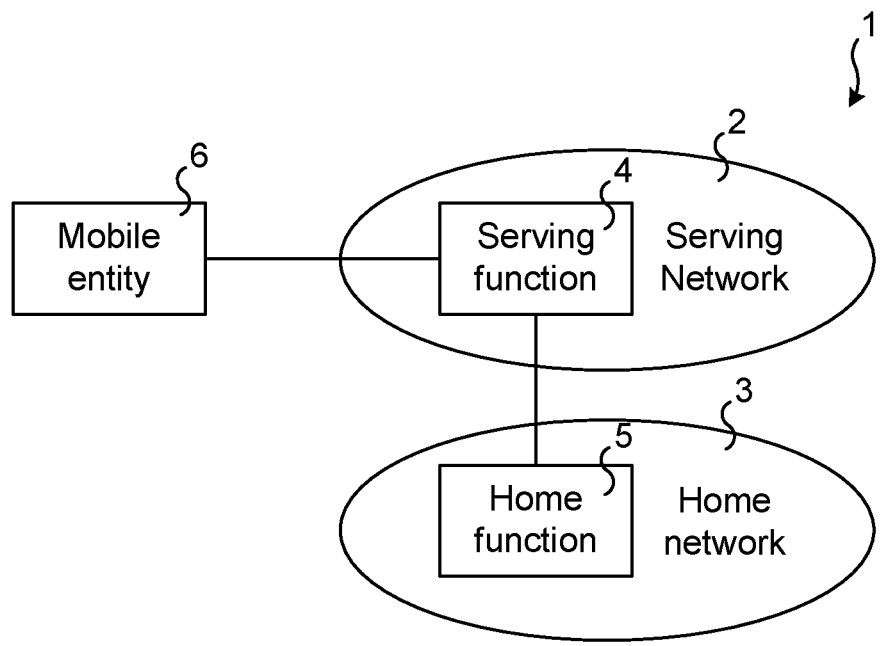
FIG. 1 illustrates schematically a general communications network in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present teachings provide, in different aspects and embodiments, privacy protection against compromised nodes of a serving network and malicious insiders as well as IMSI catchers by not providing the IMSI to the serving network, and instead providing a pseudonym which may be regularly updated. Examples of such nodes of the serving network comprise Mobile Switching Center (MSC), Serving GPRS support node (SGSN), Mobility Management Entity (MME), etc.

If the serving network node (e.g. MME) is nevertheless compromised, an attacker will only get access to the pseudonym and cannot easily deduce to which IMSI the pseudonym belongs. In addition, when a serving network node loses the TMSI or the pseudonym for a given mobile terminal, it will not request the IMSI from the mobile terminal, but rather request the pseudonym. However, it is noted that such pseudonym request may technically be implemented as a standard IMSI request, but the response from the mobile terminal comprises the pseudonym instead of the IMSI. Depending on implementation, the serving network node may issue a conventional IMSI request, but receive in response an encrypted IMSI or a pseudonym. An advantage of such embodiments is transparency to the serving network, if the pseudonym is formatted according to the same principles as an IMSI. Alternatively, the serving network node may send a new type of request, a "pseudonym request", and receive in response the pseudonym. Since the mobile terminal does not send the IMSI, at least not unencrypted, an IMSI catcher will not be able to obtain anything else than the pseudonym.

The described mechanism does not completely protect against IMSI catchers, which could catch the IMSI of a mobile terminal not yet having a pseudonym in the visited network and doing an attach request to an MME. However, the mechanism can be combined with other security measures, such as the above-mentioned encryption of IMSI. An example of such encryption comprises encrypting a mobile subscription identification number (MSIN) part of the IMSI using a public key of the home network operator before sending it from the mobile terminal to the serving network. The serving network can still route the message to the correct home network based on the Mobile Network Code (MNC) and Mobile Country Code (MCC) parts of the IMSI, which parts can be left in clear text. It is noted that this particular encryption does not prevent the problem of misbehaving serving network nodes (e.g. MMEs). The present disclosure does that, so the two parts provides complete protection in a complementary way.

A general objective of the present teachings is to address at least one or some of the disadvantages with the prior art solutions described in the background section. The various steps described below in connection with the figures should primarily be understood in a logical sense, while each step may involve the communication of one or more specific messages depending on the implementation and protocols used.

Embodiments according to the present teachings relate, in general, to the field of providing privacy for subscribers and other users in a communications network. In particular, embodiments are described for generating a pseudonym in a home network and using this pseudonym for identifying a mobile entity used by a subscriber in a serving network. Thereby, the long-term identity of the subscriber will remain hidden from the serving network as well as entities eavesdropping on communication between the serving network and the mobile entity.

The disclosed mechanism applies to general communications networks where the subscriber can roam into a serving network which may be controlled by another (separate) legal entity than the entity controlling the subscriber's home network. As particular examples, the disclosed mechanism is applicable for instance in LTE, Wideband Code Division Multiple Access (WCDMA) and Global System for Mobile Communications (GSM) networks CDMA/CDMA2000 defined by 3GPP2, or access technologies such as those of the IEEE 802.11 (WLAN) or 802.16 (WiMAX) families, etc. In the following, aspects and embodiments according to the present teachings are described in the context of LTE, but as will be appreciated by a person skilled in the art, the teachings are applicable to a general communications network, such as illustrated in FIG. 1.

FIG. 1 illustrates schematically a general communications network 1 comprising a home network 3 controlled by a home-operator and a serving network 2 controlled by a serving operator. It is noted that the home-operator and serving operator may be the same entity. The serving network 2 may also be denoted visited network, e.g. when the serving operator is a different entity than the home-operator. A subscriber operating a mobile entity 6 has a subscription or is otherwise registered as a user with the home-operator. The subscriber, e.g. a roaming subscriber, has typically no direct business relation with the serving operator, e.g. need not be a subscriber also with the serving operator. However, it is noted that the serving network 12 and the home network 3, 13 may belong to the same operator.

In the serving network 2 a serving function 4 is controlling the mobile entity 6 operated by the subscriber, e.g. in view of authentication, bearer activation and deactivation, allocation of temporary identities for the mobile entity 6. The serving network may comprise a number of base stations, e.g. evolved Node B in case of LTE, providing wireless communication for the mobile entity 6 in one or more cells. The serving function 4 is connected to a home function 5 in the home network 3. The home function 5 may comprise a node comprising or having access to user and/or subscriber-related information, information on subscriptions such as subscriber credentials, available services, mobility management information etc.

Figure 2:
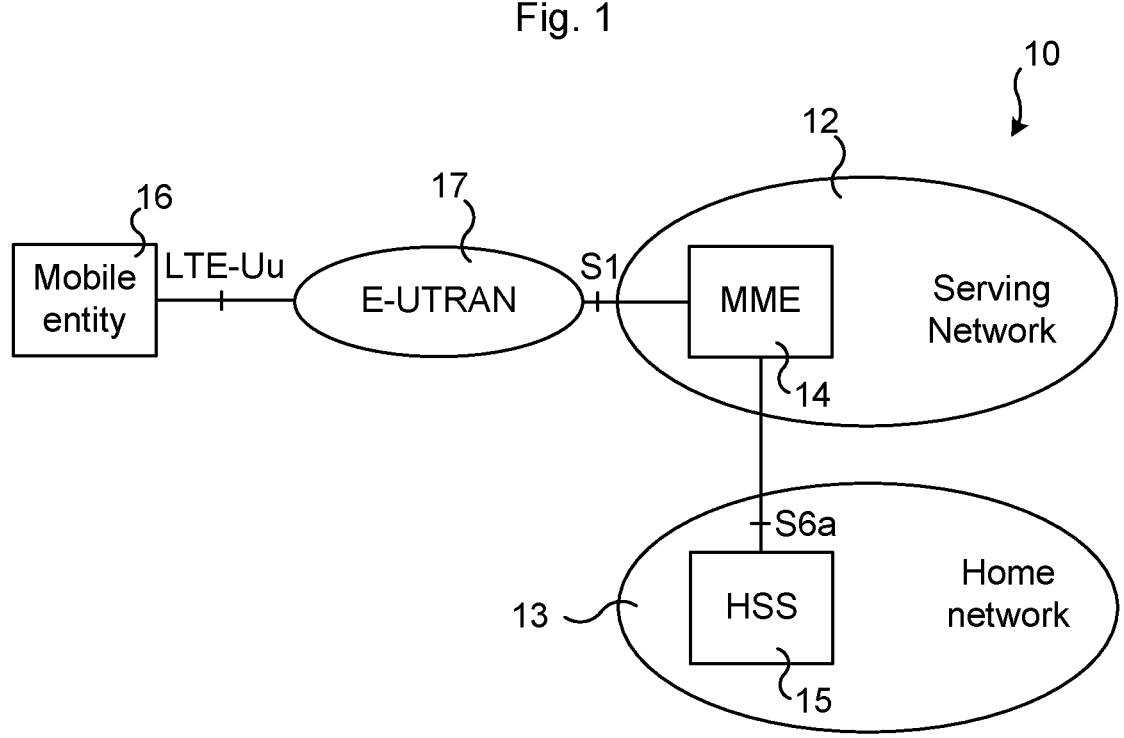
FIG. 2 illustrates schematically a basic LTE network in which embodiments according to the present teachings may be implemented.

FIG. 2 schematically illustrates a basic LTE network 10, comprising a mobile entity 16 operated by a subscriber, nodes such as a Mobility Management Entity (MME) 14 of a serving network 12, controlling the mobile entity's 16 access via the Evolved Universal Terrestrial Radio Access Network (E-UTRAN) 17, and a Home Subscription Server (HSS) 15 of the home network 3, 13. E-UTRA is the air interface of LTE, over which the mobile entity 16 communicates with eNodeBs. E-UTRAN is a combination of E-UTRA, UEs and eNnodeBs, generally indicated at reference numeral 17. The MME 14 is an example on the serving function 4 mentioned with reference to FIG. 1, while the HSS 15 is an example on the home function 5. The eNodeBs of the E-UTRAN 17 communicates with the MME 14 over an S1 interface. The MME 14 in turn communicates with the HSS 15 over an S6a interface. It is noted that the UE 16 comprises mobile equipment (ME) and a Universal Subscriber Identity Module (USIM), and the ME typically has an identifier, e.g. International Mobile Station Equipment Identity (IMEI), enabling the communications network to identify the device. The UE 16 also comprises an identifier, e.g. the IMSI associated with a subscription tied to the UE 16, the subscription allowing the UE 16 to be used for obtaining services from the communications network. The UE user identifier (e.g. IMSI) is typically provided on a removable card, e.g. Universal Integrated Circuit Card (UICC) card, while the ME identifier (e.g. IMEI) can be found in or on the ME 16.

It is noted that when the subscription/IMSI is associated with a removable card such as UICC, the ME part of the UE 16 may in principle change over time due to so called "plastic roaming"; when the user/subscriber simply moves the UICC from one ME to another. Such plastic roaming does not affect the principles of the invention. It is not possible to maintain service while the UICC is moved from one ME 16 to another, and the description below relates to steps and methods occurring while the UICC is inserted into a specific ME 16.

Figure 3:
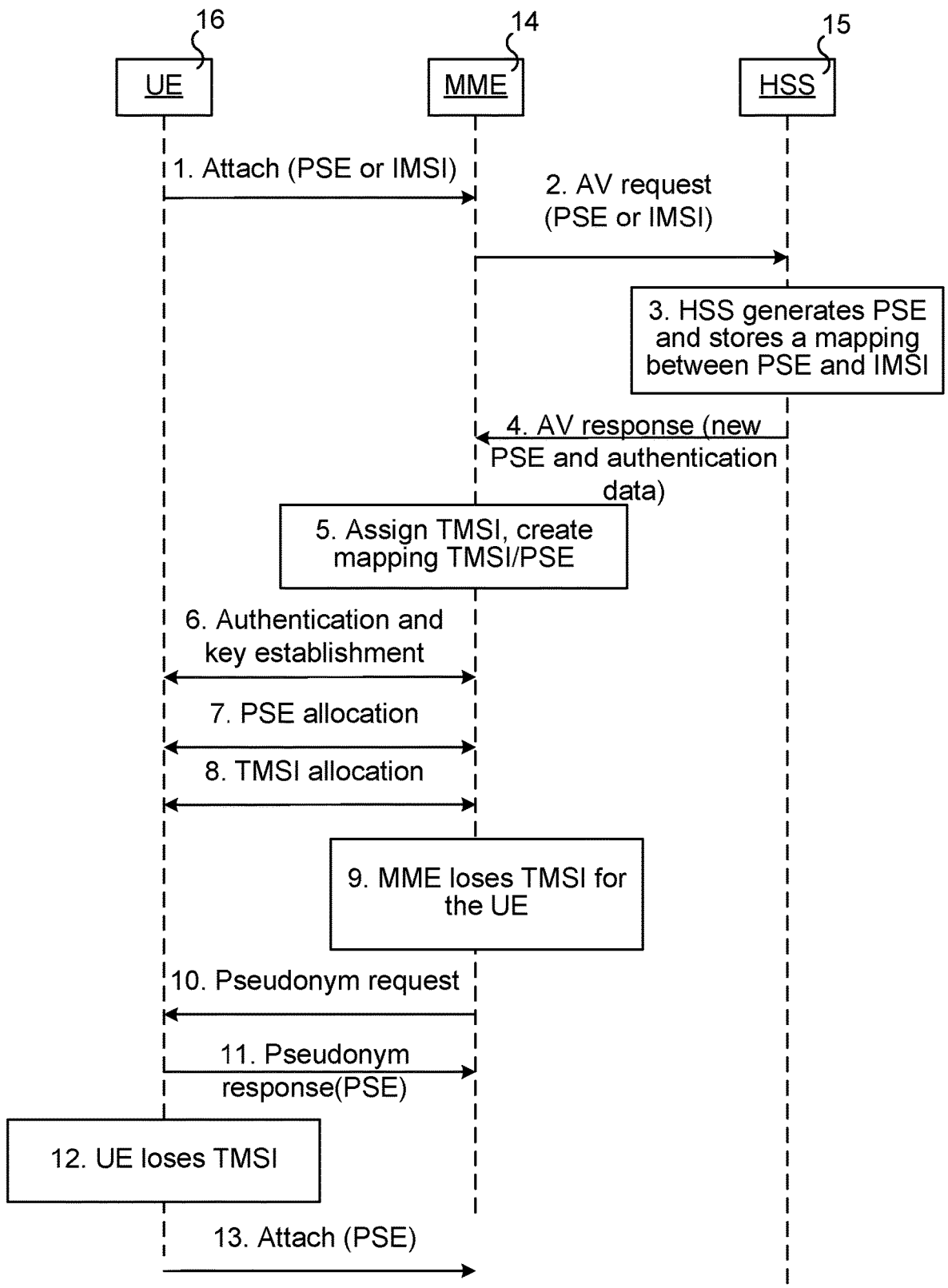
FIG. 3 is an exemplary sequence diagram illustrating an aspect according to the present teachings.

FIG. 3 is an exemplary sequence diagram illustrating an aspect according to the present teachings. In the disclosed mechanism, a pseudonym is used to protect the privacy of the long-term subscriber identity in the LTE environment. In the following, the mobile entity 16 is represented and exemplified by a user equipment (UE) 16.

At arrow 1, the UE 16 performs an attach procedure to the MME 14 when the UE 16 registers to the serving network 12. If the UE 16 has access to a TMSI, the UE 16 may use it in an attach request of the attach procedure. The mechanism according to the present teachings interacts well with this existing TMSI mechanism (not shown in FIG. 3). If no TMSI is available, the UE 16 may identify itself using a pseudonym (PSE) instead of the IMSI, as will be explained below. Further, the TMSI may be mapped to/from the pseudonym PSE rather than to/from the IMSI. Thus, as a principle, whenever identification by means IMSI would normally be required, the PSE is used instead. Only the home network 13, e.g. the HSS 15 thereof, and the UE 16 know the mapping between the PSE and IMSI. While the MME 14 knows the mapping between PSE and TMSI, it thus does not know the mapping between TMSI and IMSI. This is in contrast to today's systems where also the MME 14 knows the mapping between TMSI and IMSI. In the disclosed mechanism, the IMSI is hidden from the serving network 12, including the MME 14.

In the case that the UE 16 does not yet have a PSE, it may need to use its long-term identity IMSI instead. As mentioned briefly, encryption of the IMSI by a public key of the home network 13 may in such cases be used to prevent the IMSI from being eavesdropped during transit of the IMSI from the UE 16 to the HSS 15. The UE 16 may for instance encrypt part of the IMSI, e.g. encrypt the MSIN part of the IMSI using the public key of the home network 13 whereas MCC and MNC parts of the IMSI may be kept un-encrypted. The serving network 12, in particular the MME 14 thereof, is then not provided any information about the UE 16 and hence not about its subscriber, besides the identity of the home network of the subscriber. In a broadest embodiment of the present teachings, the initial use of un-encrypted IMSI may also be used, thereafter relying on the privacy protection provided by the pseudonym PSE. In the following, the term "encrypted IMSI" is used, and the term encompasses cases wherein the entire IMSI is encrypted as well as cases wherein only part of the IMSI is encrypted.

Upon reception of the attach request, the MME 14 requests an Authentication Vector (AV) from the HSS 15 (arrow 2). The AV request comprises the PSE or the encrypted IMSI as sent by the UE 16. The HSS 15 may then use the pseudonym PSE (or IMSI after decryption) to allocate or generate a new pseudonym PSE (box indicated at reference numeral 3). The new pseudonym is preferably chosen to be distinct from other pseudonyms, currently associated with other subscribers. In some embodiments, the pseudonym PSE may be chosen to have the same format as an IMSI, e.g. being structurally composed of MCC, MNC and MSIN fields. In such case, MCC and MNC may be identical to the corresponding sub-fields of the IMSI and only the MSIN part carries the pseudonym information. Further, still with reference to box 3, the HSS 15 creates a link between the generated pseudonym PSE and the long-term identity IMSI, e.g. a mapping between them. The HSS stores the created link or the mapping or makes the created link/mapping otherwise retrievable for future use, e.g. by sending it for storage elsewhere.

The HSS 15 includes the new pseudonym PSE (or the old pseudonym, in a new was not generated) together with the AV in a response (arrow 4) to the MME 14. In any case, a PSE (old or new) takes the place of what conventionally would be the IMSI. When, in box indicated at reference numeral 5, the MME 14 receives the AV from the HSS 15, the MME 14 can use the AV to authenticate and assign a Temporary IMSI (TMSI) to the UE 16. The MME 14 further creates a mapping between the assigned TMSI and the pseudonym PSE received from the HSS 15. It is noted that the MME 14 does not know the long-term identity of the subscription associated with the UE 16, i.e., the IMSI stored on the Universal Subscriber Identity Module (USIM) (or corresponding card, device or the like of the UE).

There is, as indicated by double-headed arrow 6, authentication and key establishment signaling between the UE 16 and the MME 14 (typically via intermediate node(s) such as gateways and eNodeBs). Generally, the purpose of the AKA procedure is to provide mutual authentication between the UE 16 and the serving network 12.

According to the present teachings, the MME 14 also transfers the pseudonym PSE to the UE 16 (double-headed arrow 7), which the UE 10 may be configured to acknowledge receipt of. "Transfer" is in this context understood as being provided to the UE 16, typically via intermediate nodes such as eNodeBs. This may be done in the same procedure as the TMSI allocation procedure (double-headed arrow 8). It may alternatively be done by the HSS 15 including the pseudonym PSE as a new information element that is transferred together with authentication information (exemplified by AUTN and RAND) from the HSS 15 to the UE 16 (again via intermediate nodes). This is disclosed and described in more detail with reference to FIG. 4. The pseudonym PSE may, in some embodiments, be included as part of AUTN or RAND. The pseudonym PSE would preferably be encrypted from the HSS 15 to the UE 16.

In case the MME 14 would, for any reason, loose the pseudonym PSE or TMSI for a given UE 16 (box indicated at reference numeral 9), the MME 14 may request the pseudonym PSE from the UE 16 (arrow 10). The UE 16 in turn replies with the pseudonym PSE (arrow 11). In a regular LTE network and according to prior art, the MME 14 would in this situation have to request the IMSI from the UE 16 and the UE 16 would then risk revealing it to potential eavesdroppers since it would have to be sent in clear text. In case the UE 16 loses the TMSI (box indicated at reference numeral 12), it can re-attach (arrow 13) to the network using the pseudonym PSE as the identifier just as it did in the first step, and thereby avoiding revealing the IMSI.

According to an aspect of the present teachings, the MME 14 may request any context information related to a mobile subscriber or mobile entity 16 from the HSS 15 using the pseudonym PSE. The MME 14 may even send the request to a different node than an HSS 15. An MME 14 may for instance send the request to another MME which, for some reason, may have knowledge about the user and the user's pseudonym PSE. An example of such situation, wherein a first MME could send a request to a second MME, comprises when a UE 16 has moved into a service area covered by the second MME. In that case the UE 16 will present the MME in the new service area with the pseudonym PSE, for example in a Tracking Area Update message. The second MME in the new service area would then, based on the pseudonym PSE, request the security context for the UE 16 from the first MME serving the service area to which the UE 16 was previously connected.

Figure 4:
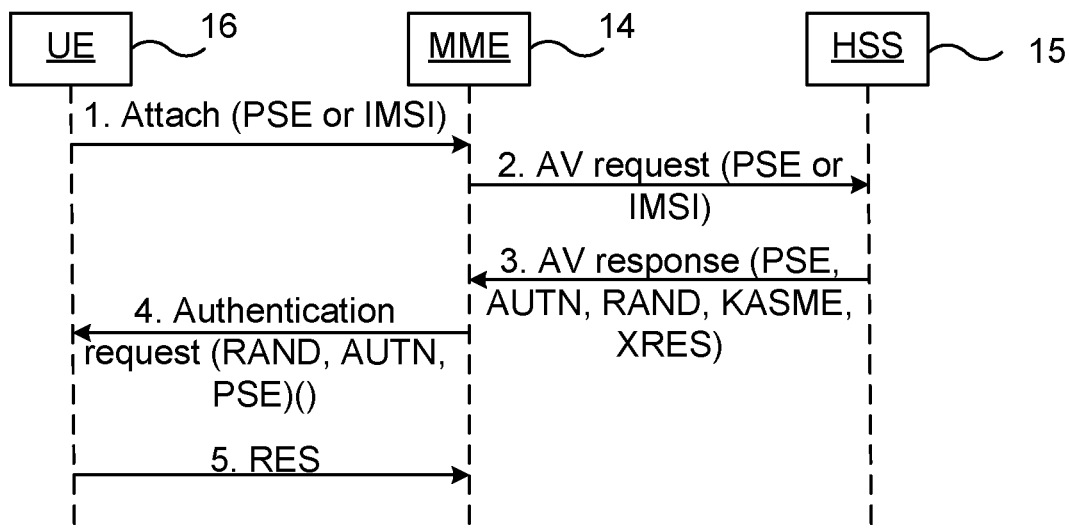
FIG. 4 is an exemplary sequence diagram illustrating an aspect according to the present teachings.

FIG. 4 is an exemplary sequence diagram illustrating an aspect according to the present teachings. In particular, a message sequence diagram is shown illustrating how the authentication in LTE may be augmented in order to provide the UE 16 with the pseudonym PSE during the authentication procedure (schematically illustrated at arrow 6 of FIG. 3). When the UE 16, at arrow 1, attaches to the MME 14 of a serving network 12 it may use the pseudonym PSE or the encrypted IMSI. The MME 14 then sends (arrow 2) the AV request to the HSS 15, the request comprising the pseudonym PSE or the encrypted IMSI, whichever it received from the UE 16. The HSS 15 sends in response (arrow 3), to the MME 1, the AV response and include in this response a new information element: the pseudonym PSE. The response may comprise the conventional AV response message comprising information elements AUTN and RAND, KASME, XRES, with the new information element pseudonym PSE added. The pseudonym PSE may be encrypted, as mentioned earlier. The conventional authentication vector comprises these four parameters: a random number (RAND), an authentication token (AUTN), an expected user response (XRES) and an intermediate access security management entity key (KASME). The MME 14 sends (arrow 4) an authentication request to the UE 16 including the RAND, AUTN in conventional way, and also the PSE. The UE 16 responds (arrow 5) to the authentication request in conventional way, e.g. calculates a response parameter RES based on AUTN and RAND, and now also has the pseudonym PSE, which it may use to authenticate itself in the serving network 12 in subsequent message exchanges.

The HSS 15 may generate the pseudonym PSE by randomly or pseudo-randomly generating a string. As another alternative, the HSS 15 may generate the pseudonym by encrypting the IMSI (or parts thereof, e.g. the MSIN) using a time dependent key with an encryption algorithm such as according to Advanced Encryption Standard (AES) in counter mode. The term time-dependent is here only intended to mean that different keys may be used at different times, it does not necessarily imply that time is a parameter used in the derivation of the key even though this may be the case. Optionally, the HSS 15 may generate the pseudonym by inputting the IMSI and a time dependent parameter into a hash function, such as e.g. Secure Hash Algorithm-256 (SHA-256) or SHA-1, or a key derivation function, such as e.g. Hash Message Authentication Code-SHA-256 (HMAC-SHA-256). The pseudonym PSE may thus have a format compatible with the IMSI format is so desired, i.e. it may comprise sub-fields equivalent to the MCC, MNC and MSIN.

In other embodiments, the HSS 15, or more generally a database server handling the user's subscription, may generate the pseudonym in accordance with what has been described, but using a different long-term identity than the IMSI. It could for example be a Network Access Identifier, an IP Multimedia Subsystem (IMS) Multimedia Public Identity (IMPU) or IP Multimedia Private Identity (IMPI) a social network login identifier (e.g. Facebook login identifier), or some username. This provides a convenient way to integrate use of non-SIM based identities, since the format of the generated pseudonym PSE, being e.g. a bit string, can easily be made to be indifferent to the format of the underlying long-term identity, irrespective of it being the IMSI, Facebook ID, or something else.

A common way to handle both IMSI/USIM-based identifies as well as non-IMSI/USIM identifiers within the same framework is in the context of the EAP protocol. In EAP, the network may request user/subscriber identity using the message EAP-Request/Identity and the user/subscriber (called "peer" in EAP terminology) provides it in an EAP-Response/Identity message. EAP suffers from the same problems as discussed above and there may be situations where an UE 16 using EAP will be forced to reveal its long-term identifier. If, for example, EAP-AKA is used, this long-term identifier will again be the IMSI. While some EAP methods provide so called pseudonyms, it should be noted that these are not accessible to intermediary networks such as a serving network 12. Therefore, when the serving network needs to perform e.g. mobility management, some other identifier will be needed and that identifier could still leak information about the user/subscriber.

The present teachings may be applied also in such contexts. Considering, for example, a situation wherein the UE 16 is a WLAN terminal accessing a serving network 12 over WLAN. The node corresponding to the MME 14 may now instead be the WLAN Access Point or a PDG (Packet Data Gateway). The node in the home network 13 corresponding to the HSS 15 may still be a HSS or more generally, an Authentication, Authorization and Accounting (AAA)/EAP server. In this case, when the UE 16 receives an EAP-Request/Identity message, it may include a previously assigned pseudonym PSE (or an encrypted long-term identifier such as IMSI) in the corresponding EAP-Response/Identity. Using the present teachings renders it possible to make the same pseudonym PSE available to the serving network 12, e.g. for mobility management purposes. For example, the PSE could be included in Diameter or Radius protocol based signaling between nodes of the home network 13 and the serving network 12. Other handling/updates of PSE are analogous to what has just been described.

According to yet another aspect, the HSS 15 calculates the pseudonym PSE based on the RAND used in the Authentication and Key Agreement (AKA) protocol and/or based on a key derived in one or more steps from the RAND, e.g., in LTE the Key Access Security Management Entity (KASME) key. Since the UE 16 can calculate the same pseudonym PSE from the received RAND and/or KASME, the MME 14 does not need to send the pseudonym PSE to the UE 16 over the air interface.

In yet another embodiment, the HSS 15 may calculate the PSE from the SQN xor AK field which is present in the AUTN. The SQN is the sequence number associated with the authentication vector, and AK is the anonymity key associated with the authentication vector. It is noted that SQN xor AK is unique for each new authentication vector. A reason for not using SQN directly is that, if the authentication key AK is not equal to all zeroes, the SQN is only visible/accessible inside the USIM. The SQN is not visible in the actual UE 16 and can hence not be used by the UE 16 to calculate PSE. This is not a problem since the SQN xor AK is statistically unique for each authentication vector.

The HSS 15 and/or the UE 16 may loose the pseudonym PSE. This can occur, e.g., due to a re-start of the HSS 15. When this happens, the UE 16 would not be able to present the pseudonym PSE as an identifier anymore and would have to rely on sending the long-term identity, the IMSI. The disclosed mechanism provides a solution for this situation as well. As explained in the background section, the UE 16 can send the long-term identity encrypted with the home network's (e.g. HSS's 15) public key to break free from this dead lock, and get a new pseudonym PSE according to the procedure described with reference to FIG. 3.

Other parameters than those explicitly mentioned herein may be input to a Key Derivation Functions (KDF), Message Authentication Codes (MAC) and any other functions in all instances described herein. The parameters may be put in a different order than explicitly mentioned. The parameters may be transformed before being input to the function. For example, a set of parameters P1, P2, . . . , Pn, for some nonnegative integer n, could be transformed by first being run through a second function f and the result of that, i.e., f(P1, P2, . . . , Pn), being input to the function.

An exemplary embodiment of the key derivation is when the parameter P1 is first transformed before being input to a KDF to calculate a key called "output_key": output_key= KDF(f(P1), some other parameter), where f is some arbitrary function or chain of functions. The input "some other parameter" could be 0, 1 or more other parameters, e.g., used to bind the key to a certain context. Sometimes, the notation " . . . " may be used as a synonym for "some other parameter". Parameters may be input as separate parameters or may be concatenated together and then input in one single input to the KDF. Even in the presence of things like these, the core of the idea remains the same.

It is noted that the present teachings are also applicable when IMSI identifiers are used within Extensible Authentication Protocol (EAP)-AKA.

Figure 5:
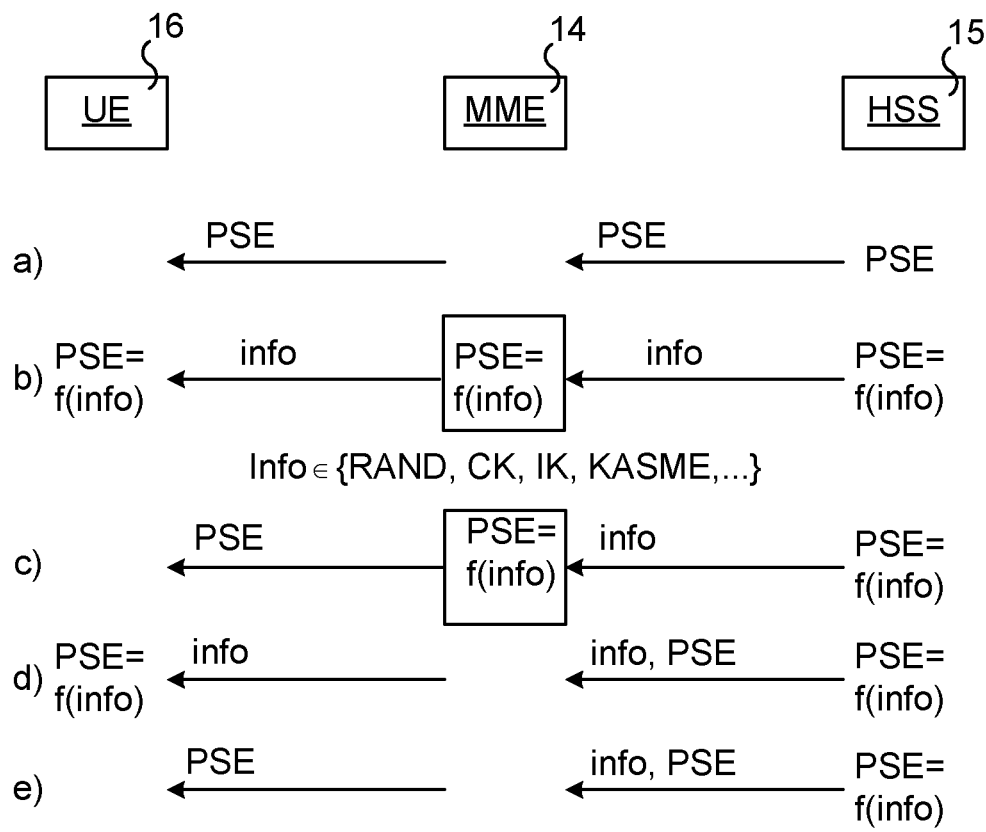
FIG. 5 summarizes exemplary ways of conveying a pseudonym from a home network to a mobile entity.

FIG. 5 summarizes some of the above aspects according to the present teachings, and in particular five exemplary ways of conveying a pseudonym from a home network 13, in particular the HSS 15 thereof, to a mobile entity 16.

A first option, indicated at a), is that the HSS 15 simply sends the pseudonym, PSE, to the UE 16 via the MME 14. That is, the MME 14 merely acts as a middle-hand and conveys the PSE, that is receives from the HSS 15, to the UE 16.

A second option, indicated at b) is that the HSS 15 uses a function f taking some information "info" as input to calculate the PSE. The HSS 15 then sends the information "info" to the MME 14, which has the function f and having received the info may calculate the PSE for the UE 16 and store it as identifier of the UE 16. The MME 14 then sends the "info" to the UE 16, which also has the function f and can calculate the PSE and use for identifying itself in the serving network 12. The "info" may for instance comprise the RAND, KASME, cipher key (CK) or integrity key (IK) or any other key or set of keys that have been described. The USIM of the UE 16 computes the cipher key CK and the integrity key IK as a function of RAND in the conventional authentication responses.

A third option, indicated at c) is that the HSS 15 again uses a function f taking some information "info" as input to calculate the PSE. The HSS 15 then sends the information "info" to the MME 14, which has the function f and having received the info may calculate the PSE for the UE 16 and store it as identifier of the UE 16. The MME 14 then sends the PSE (instead of "info" as in the second option) to the UE 16, which thus receives the PSE and may use it identifying itself in the serving network 12. In this case, the UE 16 does not have to have the function f.

A fourth option, indicated at d) is that the HSS 15 once again uses a function f taking some information "info" as input to calculate the PSE. The HSS 15 then sends the information "info" along with the PSE to the MME 14. In this option though, the MME 14 does not have the function f but may store the PSE as an identifier of the UE 16 having received it from the HSS 15. The MME 14 forwards the "info" to the UE 16, which has the function f and may calculate the PSE having received the "info" from the MME 14. The UE 16 may then use the PSE for identifying itself in the serving network 12.

A fifth option, indicated at e) is that the HSS 15 uses a function f taking some information "info" as input to calculate the PSE. The HSS 15 then sends the information "info" along with the PSE to the MME 14. The MME 14 stores the PSE for the UE 16 and also forwards the PSE to the UE 16. The MME 14 nor the UE 16 needs to have the function f in this case.

In view of backwards compatibility issues, it is possible that some aspects of the present teachings may be introduced and implemented only starting with a new generation of networks, e.g. with the fifth generation, 5G. If implementing the present teachings in legacy networks, a vast amount of legacy nodes would have to be updated, preferably simultaneously in order to keep the networks running. Fallbacks for allowing use of legacy authentication would have to be implemented. This may lead do possibilities of downgrade attacks where the network and/or the devices are fooled into believing they must refrain from using the herein disclosed enhanced privacy method due to the (incorrect) belief that the other party does not support it. If on the other hand the present teachings are implemented for 5G and onwards, it may be assumed that all entities supporting the 5G radio interface will also support implementation of the present teachings and no backwards compatibility problems would arise. For instance, the mobile entities would not respond to requests from visited networks for its long-term identity, but would instead use only the pseudonym and/or would only provide an encrypted IMSI.

The various embodiments and features that have been described may be combined in different ways, examples of which are given in the following with reference first to FIG. 6.

Figure 6:
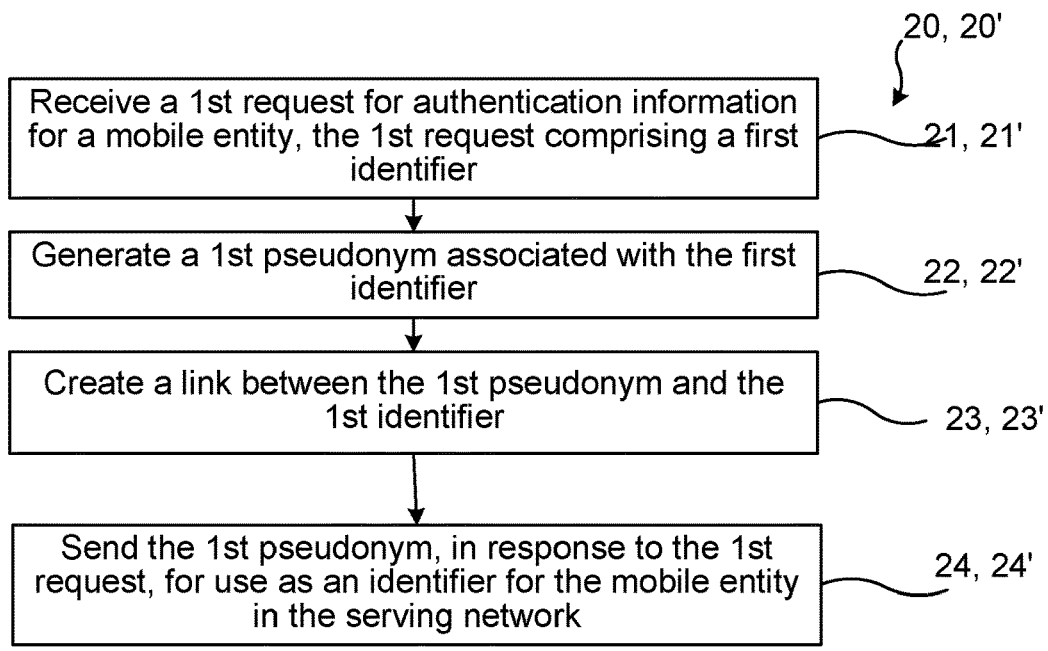
FIG. 6 illustrates a flow chart over steps of an embodiment of a method in a first network node (e.g. HSS) in accordance with the present teachings.

FIG. 6 illustrates a flow chart over steps of an embodiment of a method for a first network node (e.g. HSS) in accordance with the present teachings. The method 20 may be performed in a first network node 5, 15 for protecting confidentiality of a first identifier associated by the first network node 5, 15 with a subscription used by a mobile entity 6, 16 in a communications network 1, 10. The first network node 5, 15 may for instance comprise a home network function, such as a HSS. The communications network 1, 10 comprises a home network 3, 13 of the mobile entity 6, 16 and a serving network 2, 4, 12, 14 serving the mobile entity 6, 16. As described earlier (e.g. in relation to FIG. 5), in some embodiments a pseudonym is explicitly communicated from the home network function 5, 15 to the serving network 2, 4, 12, 14 whereas in other embodiments, only "info" from which the pseudonym can be derived is communicated. "Pseudonym" may hence also, in the following, be interpreted as information corresponding to a pseudonym, e.g. information from which a pseudonym is derived.

The method 20 comprises the following steps performed by the first network node 5, 15, which is part of the home network 3, 13:

Receiving 21, from a second network node 4, 14, which is part of the serving network 2, 12, a first request for authentication information for the mobile entity 6, 16, the first request comprising the first identifier. The first identifier may for instance comprise an IMSI of the mobile entity 6, 16 in encrypted format (encrypted IMSI).

Generating 22 a first pseudonym associated with the first identifier.

Creating 23 a link between the first pseudonym and the first identifier. The creating 23 may for instance comprise creating a mapping between the first pseudonym and the first identifier.

Sending 24, to the second network node 4, 14, the first pseudonym in response to the first request for authentication information for use as an identifier for the mobile entity 6, 16 in the serving network 2, 12. The second network node 4, 14 may use the first identifier in different ways, e.g. in order to keep track of mobility of the mobile entity 6, 16 and request contexts associated with the mobile entity 6, 16 from other nodes by using the first identifier.

An advantage provided by the method 20 is that an increased protection of the privacy of the user or subscriber of the mobile entity 6, 16 is enabled. The serving network 2, 12, e.g. a second network node 4, 14 such as a mobility management entity thereof, is provided only with a pseudonym of the mobile entity 6, 16 and not any information about the actual identity of the mobile entity 6, 16 which in turn could reveal information about the user of the mobile entity 6, 16. It would also be difficult for an attacker that intercepts this information to deduce any information about the user of the mobile entity (or about the subscription tied to the mobile entity, which in turn could give information about the user).

In an embodiment, the method 20 comprises:

receiving, from the second network node 4, 14, a second request for authentication information for the mobile entity 6, 16, the second request comprising the first pseudonym associated with the first identifier, generating a second pseudonym associated with the first identifier, updating the link between the first pseudonym and the first identifier to a link between the second pseudonym and the first identifier, and sending, to the second network node 4, 14, the second pseudonym in response to the second request for authentication information.

The second network node 4, 14 may have received the first pseudonym from the mobile entity 6, 16 e.g. as a message of an attachment procedure, and then turned to the home network 3, 13, in particular the first network node 5, 15 thereof, in order to authenticate the mobile entity 6, 16. In response to receiving the second request the home network 3, 13, e.g. the first network node 5, 15 thereof, generates a second pseudonym associated with the first identifier, and sends it to the serving network 2, 12, e.g. the second network node 4, 14 thereof. The existing link between the first pseudonym and the first identifier is updated by the first network node 5, 15 to a link between the second pseudonym and the first identifier. An attacker having captured the first pseudonym has then no use of it, as it no longer is used by the communications network. The pseudonym may thus be updated frequently, which makes the privacy protection provided by the method 20 even more secure.

In various embodiments, the first identifier comprises a long-term identity associated with a subscription used by the mobile entity 6, 16, such as the IMSI of the mobile entity 6, 16, preferably encrypted IMSI or a third (old) pseudonym previously generated for the mobile entity 6, 16. The IMSI may be encrypted in the mobile entity 6, 16 using e.g. a public key associated with the home network 3, 13; the public key may be specific for the first network node 3, 13 or generic for the entire home network 3, 13.

In an embodiment, the first identifier comprises an IMSI in encrypted format and the receiving 21 comprises receiving and decrypting the first identifier. The first identifier, e.g. IMSI, may have been encrypted at the mobile entity 6, 16 by use of a public key associated with the home network 3, 13. The identity of the mobile entity 6, 16 and user thereof is thereby protected all the way from the mobile entity 6, 16 to the first network node 5, 15 in the home network 3, 13, preventing the identity to be captured over the air interface between the mobile entity 6, 16 and the second network node 4, 14 of the serving network 2, 12.

In an embodiment, the sending 24 of the first pseudonym to the serving network 2, 12, in particular to the second network node 4, 14 thereof, comprises encrypting the first pseudonym and sending the encrypted first pseudonym for transferal by the serving network 2, 4, 12, 14 to the mobile entity 6, 16. When the first network node 5, 15 encrypts the first pseudonym before sending it to the second network node 4, 14 (of the serving network 2, 12), the second network node 4, 14 merely conveys it to the mobile entity 6, 16, which may decrypt it. This provides an even higher degree of protection of the privacy.

In various embodiments, the generating 22 comprises selecting a random number or a pseudo random number, or applying a cryptographic function to at least a long-term identity associated with a subscription used by the mobile entity 6, 16, wherein the cryptographic function comprises one of: encryption function, a hash function or a key derivation function. Many different options are thus available for generating the pseudonyms.

The method 20 may be performed in a single node or in a distributed manner, wherein different steps are performed by different network nodes or other entities. It is noted that the steps of the method 20 may be performed by different (logical) entities arranged in a single network node or distributed over several network nodes. The method 20' may hence be performed in a communications network 1, 10 for protecting confidentiality of a first identifier associated by a first network node (5, 15) with a subscription used by a mobile entity 6, 16. The communications network 1, 10 comprises a home network 3, 13 of the mobile entity 6, 16 and a serving network 2, 4, 12, 14 serving the mobile entity 6, 16.

The method 20' comprises receiving 21', in the home network 3, 5; 13, 15, a first request for authentication information for the mobile entity 6, 16 from the serving network, the first request comprising the first identifier; generating 22', in the home network 3, 5; 13, 15, a first pseudonym associated with the first identifier, creating 23' a link between the first pseudonym and the first identifier, and sending 24', to the serving network 2, 4; 12, 14, the first pseudonym in response to the first request for authentication information for use as an identifier for the mobile entity 6, 16 in the serving network 2, 12.

Figure 7:
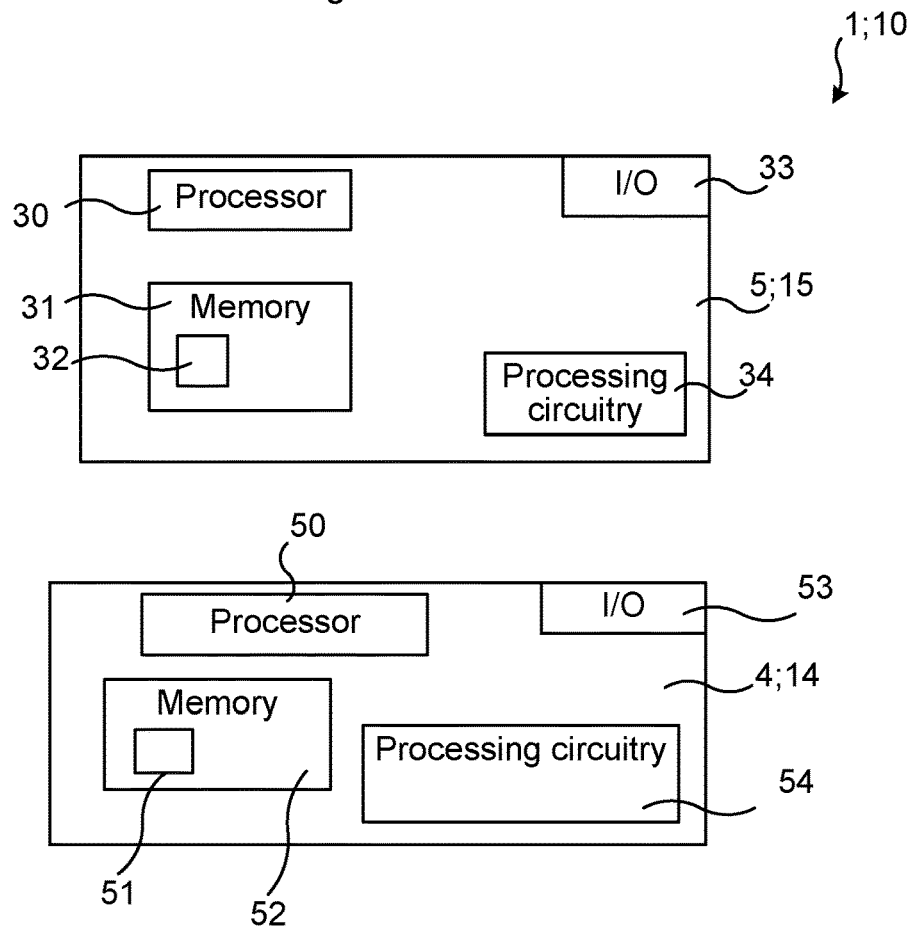
FIG. 7 illustrates schematically a communications network and means for implementing embodiments in accordance with the present teachings.

FIG. 7 illustrates schematically a communications network 1, 10 and means for implementing embodiments in accordance with the present teachings. A first network node 5, 15 (e.g. HSS) of a communications network is illustrated schematically in which the method as described e.g. with reference to FIG. 6 may be implemented.

The first network node 5, 15 comprises a processor 30 comprising any combination of one or more of a central processing unit (CPU), multiprocessor, microcontroller, digital signal processor (DSP), application specific integrated circuit etc. capable of executing software instructions stored in a memory 31 which can thus be a computer program product 31. The processor 30 can be configured to execute any of the various embodiments of the method for instance as described in relation to FIG. 6.

The memory 31 can be any combination of read and write memory (RAM) and read only memory (ROM), Flash memory, magnetic tape, Compact Disc (CD)-ROM, digital versatile disc (DVD), Blu-ray disc etc. The memory 31 may also comprise persistent storage, which, for example, can be any single one or combination of magnetic memory, optical memory, solid state memory or even remotely mounted memory.

The first network node 5, 15 also comprises an input/output device 33 (indicated by I/O in FIG. 7) for communicating with other entities, e.g. with network nodes of visited network 4, 14 of the mobile entity 6, 16 and with other network nodes in the home network 3, 13, which the first network node 5, 15 is part of. Such input/output device 33 of the first network node 5, 15 may comprise a communication interface.

The first network node 5, 15 may also comprise additional processing circuitry, schematically indicated at reference numeral 34, for implementing the various embodiments according to the present teachings.

The present teachings provide computer programs 32 for the first network node 5, 15. The computer programs 32 comprises computer program code, which, when executed on at least one processor 30 on the first network node 5, 15 causes the first network node 5, 15 to perform the method 20 according to any of the described embodiments thereof.

The present disclosure also encompasses computer program products 31 comprising a computer program 32 for implementing the embodiments of the method as described, and a computer readable means on which the computer program 32 is stored. The computer program product 31 may, as mentioned earlier, be any combination of random access memory (RAM) or read only memory (ROM), Flash memory, magnetic tape, Compact Disc (CD)-ROM, digital versatile disc (DVD), Blu-ray disc etc.

A first network node 5, 15 (e.g. HSS) is provided for protecting confidentiality of a first identifier associated by a first network node (5, 15) with a subscription used by a mobile entity 6, 16 in a communications network 1, 10. The communications network 1, 10 comprises a home network 3, 13 of the mobile entity 6, 16 and a serving network 2, 4, 12, 14 serving the mobile entity 6, 16. The first network node 5, 15 is part of the home network 3, 13 and is configured to:
  receive, from a second network node 4, 14, which is part of the serving network 2, 12, a first request for authentication information for the mobile entity 6, 16, the first request comprising the first identifier,
  generate a first pseudonym associated with the first identifier, create a link between the first pseudonym and the first identifier, and send, to the second network node 4, 14, the first pseudonym in response to the first request for authentication information for use as an identifier for the mobile entity 6, 16 in the serving network 2, 12.

The first network node 5, 15 may be configured to perform the above steps e.g. by comprising one or more processors 30 and memory 31, the memory 31 containing instructions executable by the processor 30, whereby the first network node 5, 15 is operative to perform the steps. In case of several processors 30 (not illustrated), they may be configured to perform all steps of the method 20 or only part of the steps.

In an embodiment, the first network node 5, 15 is configured to:

receive, from the second network node 4, 14, a second request for authentication information for the mobile entity 6, 16, the second request comprising the first pseudonym associated with the first identifier, and generate a second pseudonym associated with the first identifier, update the link between the first pseudonym and the first identifier to a link between the second pseudonym and the first identifier, and send, to the second network node 4, 14, the second pseudonym in response to the second request for authentication information.

In various embodiments, the first identifier comprises a long-term identity associated with a subscription used by the mobile entity 6, 16 or a third (old) pseudonym previously generated for the mobile entity 6, 16.

In an embodiment, the first identifier comprises an identifier in encrypted format, and wherein the first network node 5, 15 is configured to receive and decrypt the encrypted first identifier.

In an embodiment, the first network node 5, 15 is configured to encrypt the first pseudonym and to send the encrypted first pseudonym for transferal by the serving network 2, 4, 12, 14 to the mobile entity 6, 16.

In an embodiment, the first network node 5, 15 is configured to generate by selecting a random number or a pseudo random number, or applying a cryptographic function to a long-term identity associated with a subscription used by the mobile entity 6, 16, wherein the cryptographic function comprises one of: encryption function, a hash function or a key derivation function.

The computer program products, or the memories, comprises instructions executable by the processor 30. Such instructions may be comprised in a computer program, or in one or more software modules or function modules.

Figure 8:
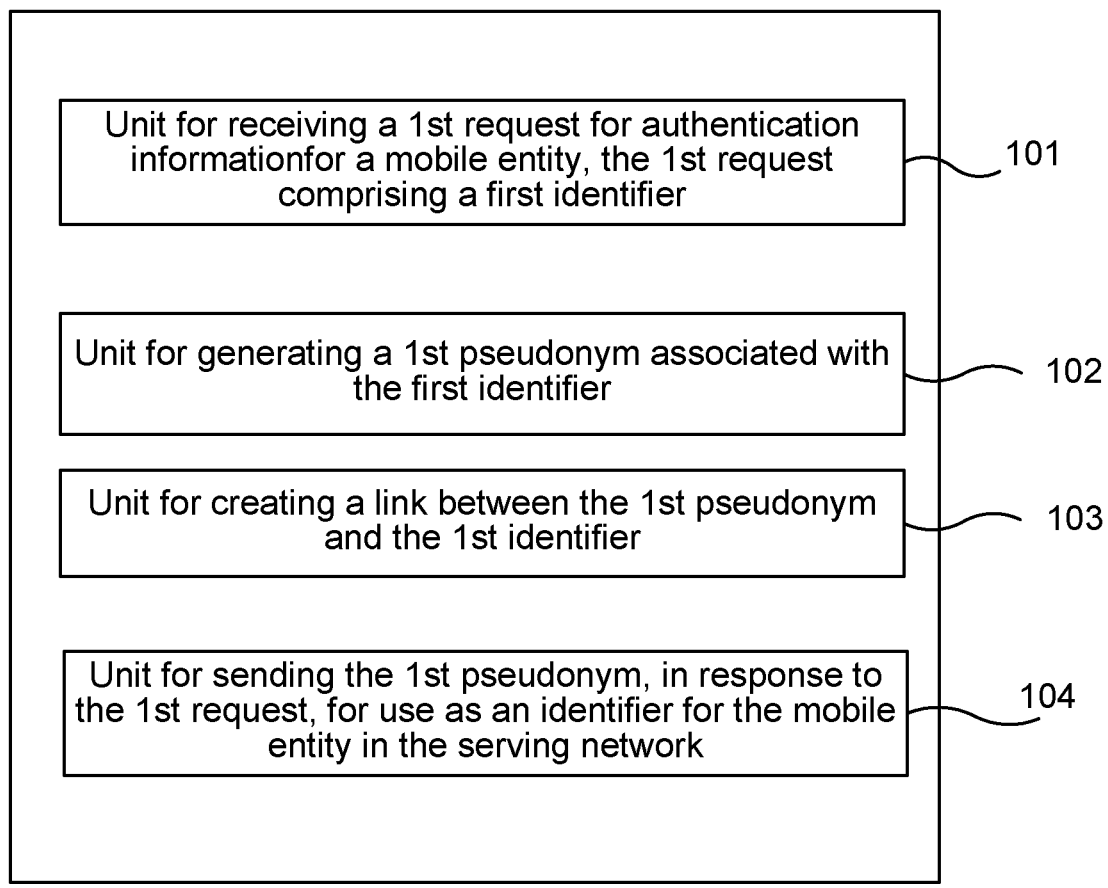
FIG. 8 illustrates a first network node comprising function modules/software modules for implementing embodiments of the present teachings.

FIG. 8 illustrates a first network node comprising function modules/software modules for implementing embodiments of the present teachings. In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A first network node of protecting confidentiality of a first identifier associated by the first network node with a subscription used by a mobile entity in a communications network is provided. The communications network comprises a home network of the mobile entity and a serving network serving the mobile entity. The first network node comprises a first unit 101 for receiving, from a second network node of the serving network, a first request for authentication information for the mobile entity, the first request comprising the first identifier. Such first unit 101 may for instance comprise a network interface and/or processing circuitry for receiving such information.

The first network node comprises a second unit 102 for generating a first pseudonym associated with the mobile entity. Such second unit 102 may comprise various processing circuitry, e.g. processing circuitry, adapted generate the first pseudonym by using program code stored in memory.

The first network node comprises a third unit 103 for creating a link between the first pseudonym and the first identifier. Such third unit 103 may comprise various processing circuitry, e.g. processing circuitry, adapted to create the link by using program code stored in memory.

The first network node comprises a fourth unit 104 for sending, to the second network node, the first pseudonym in response to the first request for authentication information for use as an identifier for the mobile entity in the serving network. Such fourth unit 104 may for instance comprise a network interface and/or processing circuitry for sending such information.

Figure 9:
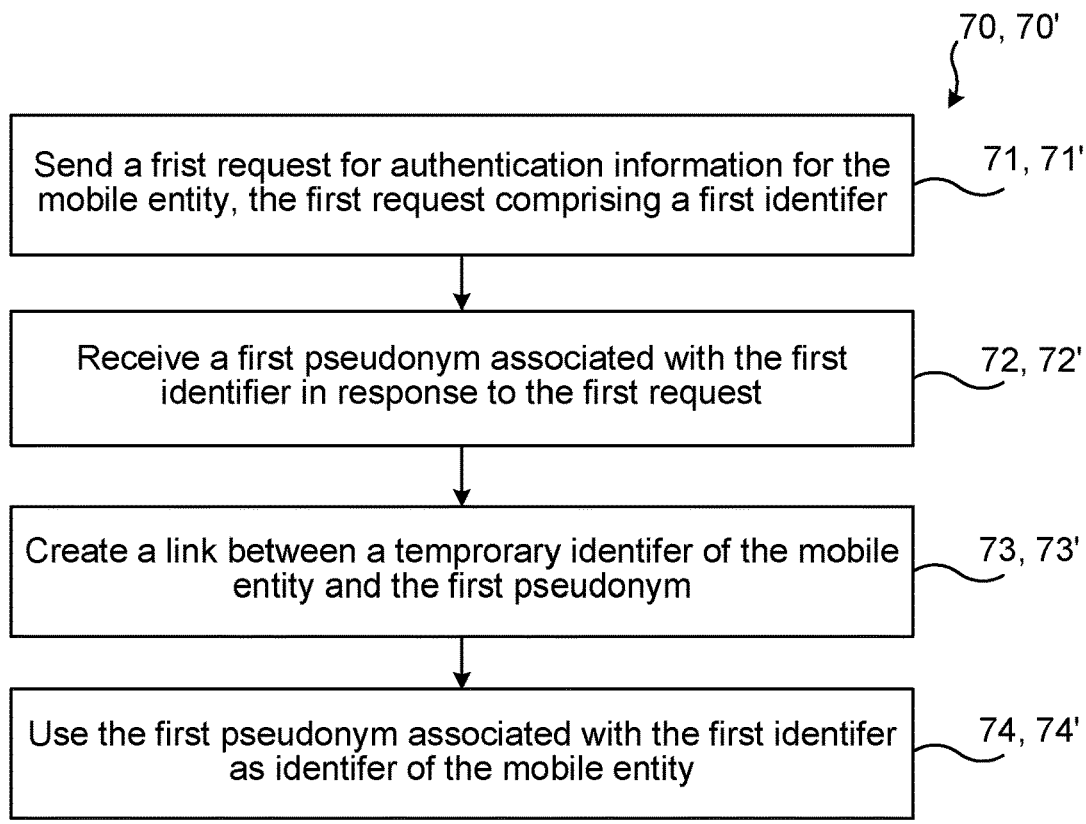
FIG. 9 illustrates a flow chart over steps of an embodiment of a method in a second network node (e.g. MME) in accordance with the present teachings.

FIG. 9 illustrates a flow chart over steps of an embodiment of a method in a second network node in accordance with the present teachings.

The method 70 of protecting confidentiality of a first identifier associated by a first network node 5, 15 with a subscription used by of a mobile entity 6, 16 in a communications network 1, 10 may be performed in a second network node 4, 14 (e.g. MME). The communications network 1, 10 comprises a home network 3, 13 of the mobile entity 6, 16 and a serving network 2, 12 serving the mobile entity 6, 16. The method 70 comprises the following steps, performed by the second network node 4, 14, which is part of the serving network 2, 12:

Sending 71, to the first network node 5, 15 (e.g. HSS), which is part of the home network 3, 13, a first request for authentication information for the mobile entity 6, 16, the first request comprising the first identifier.

Receiving 72, from the first network node 5, 15, a first pseudonym associated with the first identifier in response to the first request.

Creating 73 a link between a temporary identifier of the mobile entity 6, 16 and the first pseudonym. The creating 73 a link between a temporary identifier of the mobile entity 6, 16 may comprise or be preceded by a step of assigning a temporary identifier to the mobile entity.

Using 74 the first pseudonym as identifier of the mobile entity 6, 16. The second network node 4, 14 may use the first pseudonym as identifier as well as the temporary identifier.

In an embodiment, the method 70 comprises, prior to the sending 71, receiving from the mobile entity 6, 16 an attachment request comprising the first identifier, wherein the first identifier comprises an identifier in encrypted format, encrypted by the mobile entity 6, 16.

In an embodiment, the method 70 comprises assigning the temporary identifier to the mobile entity 6, 16.

In an embodiment, the method 70 comprises requesting, from the mobile entity 6, 16, the first pseudonym in response to determining that the temporary identifier has been lost.

In an embodiment, the receiving 72 comprises receiving the first pseudonym encrypted and the using 74 comprises conveying the encrypted first pseudonym to the mobile entity 6, 16 for use in the authenticating of the mobile entity

6, 16. In other embodiments, the second network node 4, 14 decrypts the first pseudonym before conveying it to the mobile entity 6, 16.

In various embodiments, the method 70 comprises:
receiving, from a third network node, which is part of a second serving network to which the mobile entity 6, 16 is to be handed over to, a request for the first pseudonym, and
sending, in response to the request, the first pseudonym to the third network node.

It is noted that the request from the third network node may typically comprise also request for other information besides the first pseudonym, e.g. information such as security context.

The method 70 may be performed in a single node or in a distributed manner, wherein different steps are performed by different network nodes or other entities. It is noted that the steps of the method 70 may be performed by different (logical) entities arranged in a single network node or distributed over several network nodes. The method 70' may hence be performed in a communications network 1, 10 for protecting confidentiality of a first identifier associated by a first network node 5, 15 with a subscription used by a mobile entity 6, 16. The communications network 1, 10 comprises a home network 3, 13 of the mobile entity 6, 16 and a serving network 2, 4, 12, 14 serving the mobile entity 6, 16. The method 70' comprises sending 71', from the serving network 2, 4, 12, 14 to the home network 3, 5, 13, 15, a first request for authentication information for the mobile entity 6, 16, the first request comprising the first identifier; receiving 72', from the home network 3, 5; 13, 15, a first pseudonym associated with the first identifier in response to the first request; creating 73' a link between a temporary identifier of the mobile entity 6, 16 and the first pseudonym; and using 74' the first pseudonym as identifier of the mobile entity 6, 16.

Referring again to FIG. 7, a second network node 4, 14 of a communications network is also illustrated schematically in which the method as described e.g. with reference to FIG. 9 may be implemented.

The second network node 4, 14 comprises a processor 50 comprising any combination of one or more of a central processing unit (CPU), multiprocessor, microcontroller, digital signal processor (DSP), application specific integrated circuit etc. capable of executing software instructions stored in a memory 51 which can thus be a computer program product 51. The processor 50 can be configured to execute any of the various embodiments of the method for instance as described in relation to FIG. 9.

The memory 51 can be any combination of read and write memory (RAM) and read only memory (ROM), Flash memory, magnetic tape, Compact Disc (CD)-ROM, digital versatile disc (DVD), Blu-ray disc etc. The memory 31 may also comprise persistent storage, which, for example, can be any single one or combination of magnetic memory, optical memory, solid state memory or even remotely mounted memory.

The second network node 4, 14 also comprises an input/output device 43 (indicated by I/O in FIG. 7) for communicating with other entities, e.g. with network nodes of the home network 3, 13 of the mobile entity 6, 16 and with other network nodes in the serving network 12, which the second network node 4, 14 is part of. Such input/output device 43 of the second network node 4, 14 may comprise a communication interface.

The second network node 4, 14 may also comprise additional processing circuitry, schematically indicated at reference numeral 54, for implementing the various embodiments according to the present teachings.

The present teachings provide computer programs 52 for the second network node 4, 14. The computer programs 52 comprises computer program code, which, when executed on at least one processor 50 on the second network node 4, 14 causes the second network node 4, 14 to perform the method 70 according to any of the described embodiments thereof.

The present disclosure also encompasses computer program products 51 comprising a computer program 52 for implementing the embodiments of the method as described, and a computer readable means on which the computer program 52 is stored. The computer program product 31 may, as mentioned earlier, be any combination of random access memory (RAM) or read only memory (ROM), Flash memory, magnetic tape, Compact Disc (CD)-ROM, digital versatile disc (DVD), Blu-ray disc etc.

A second network node 4, 14 is provided for protecting confidentiality of a first identifier associated by a first network node 5, 15 with a subscription used by a mobile entity 6, 16 in a communications network 1, 10. The communications network 1, 10 comprises a home network 3, 13 of the mobile entity 6, 16 and a serving network 2, 12 serving the mobile entity 6, 16. The second network node 4, 14 is part of the serving network 2, 12 and is configured to:

Send, to the first network node 5, 15, which is part of the home network 3, 13, a first request for authentication information for the mobile entity 6, 16, the first request comprising the first identifier.

Receive, from the first network node 5, 15, a first pseudonym associated with the first identifier in response to the first request.

Create a link between a temporary identifier of the mobile entity 6, 16 and the first pseudonym.

Use the first pseudonym as identifier of the mobile entity 6, 16.

The second network node 4, 14 may be configured to perform the above steps e.g. by comprising one or more processors 50 and memory 51, the memory 51 containing instructions executable by the processor 50, whereby the second network node 4, 14 is operative to perform the steps. In case of several processors 50 (not illustrated) they may be configured to perform all steps of the method 70 or only part of the steps.

In an embodiment, the second network node 4, 14 is configured to, prior to the sending, receive from the mobile entity 6, 16 an attachment request comprising the first identifier, wherein the first identifier comprises an identifier in encrypted format, encrypted by the mobile entity 6, 16.

In an embodiment, the second network node 4, 14 is configured to assign the temporary identifier to the mobile entity 6, 16.

In an embodiment, the second network node 4, 14 is configured to request, from the mobile entity 6, 16, the first pseudonym in response to determining that the temporary identifier has been lost.

In an embodiment, the second network node 4, 14 is configured to receive by receiving the first pseudonym encrypted and configured to use by conveying the encrypted first pseudonym to the mobile entity 6, 16 for use in the authenticating of the mobile entity 6, 16.

In an embodiment, the second network node 4, 14 is configured to:
- receive, from third network node, which is part of a second serving network to which the mobile entity 6, 16 is to be handed over, a request for the first pseudonym, and
- send, in response to the request, the first pseudonym to the third network node.

Figure 10:
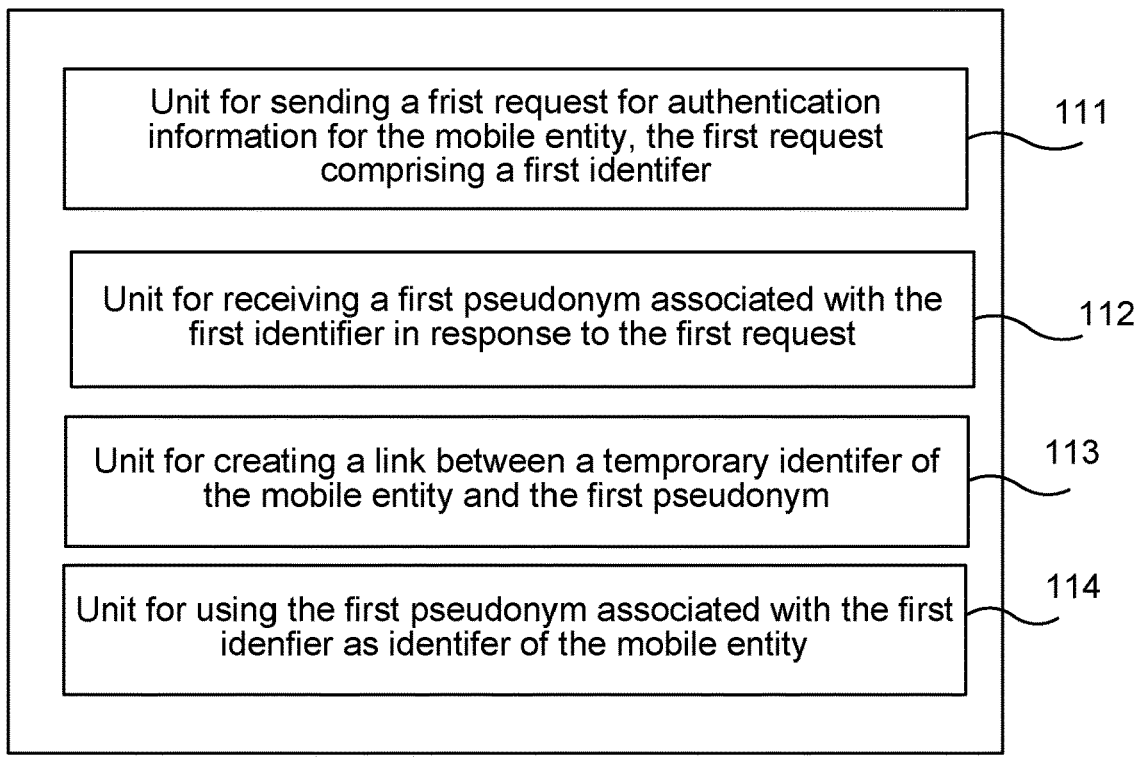
FIG. 10 illustrates a second network node comprising function modules/software modules for implementing embodiments of the present teachings.

FIG. 10 illustrates a second network node comprising function modules/software modules for implementing embodiments of the present teachings.

In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A second network node for protecting confidentiality of a first identifier associated by a first network node 5, 15 with a subscription used by a mobile entity in a communications network is provided. The communications network comprises a home network of the mobile entity and a serving network serving the mobile entity.

The second network node comprises a first unit 111 for sending, to the first network node of the home network, a first request for authentication information for the mobile entity, the first request comprising the first identifier. Such first unit 111 may for instance comprise processing circuitry for sending such request.

The second network node comprises a second unit 112 for receiving, from the first network node, a first pseudonym associated with the first identifier in response to the first request. Such second unit 112 may comprise various processing circuitry, e.g. processing circuitry, for receiving such information.

The second network node comprises a third unit 113 for creating a link between a temporary identifier of the mobile entity and the first pseudonym. Such third unit 113 may comprise various processing circuitry, e.g. processing circuitry, adapted to create the link by using program code stored in memory.

The second network node comprises a fourth unit 114 for using the first pseudonym as identifier of the mobile entity. Such fourth unit 114 may for instance comprise various processing circuitry, e.g. processing circuitry, adapted for such use by using program code stored in memory.

Figure 11:
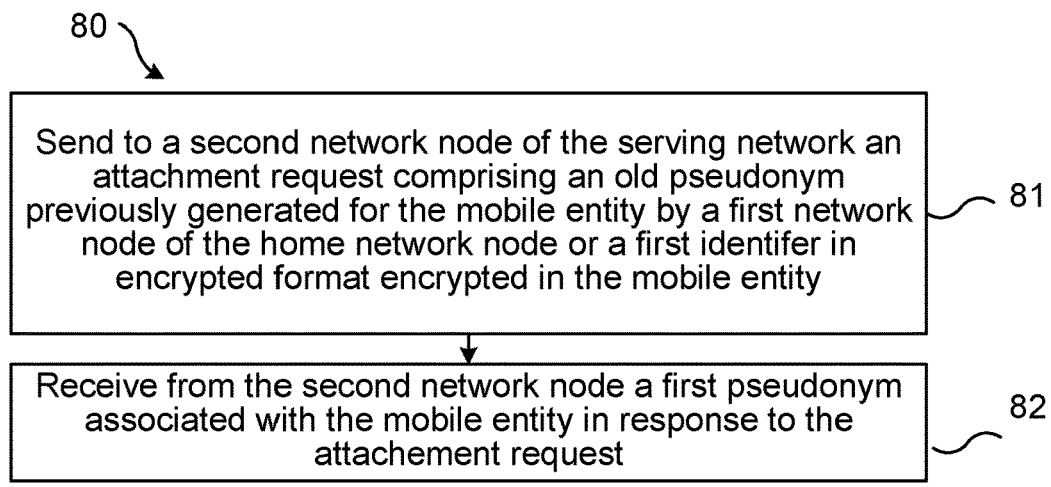
FIG. 11 illustrates a flow chart over steps of an embodiment of a method in a mobile entity in accordance with the present teachings.

FIG. 11 illustrates a flow chart over steps of an embodiment of a method in a mobile entity in accordance with the present teachings.

The method 80 may be performed in a mobile entity 6, 16 of a communications network 1, 10 for protecting confidentiality of a first identifier associated with a subscription used by the mobile entity 6, 16. The communications network 1, 10 comprises a home network 3, 13 of the mobile entity 6, 16 and a serving network 2, 12 serving the mobile entity 6, 16. The method 80 comprises:
- Sending 81 to a second network node 4, 14, which is part of the serving network 2, 4, 12, 14 an attachment request, the attachment request comprising a first pseudonym (an old pseudonym) previously generated for the mobile entity 6, 16 by a first network node 5, 15, which is part of the home network 3, 13 or the first identifier in encrypted format, encrypted in the mobile entity 6, 16. The mobile entity 6, 16 may for instance encrypt a long-term identifier thereof, e.g. IMSI, the first time it attaches to the serving network 2, 12, and if it subsequently needs to authenticate itself towards the serving network 2, 12, then it may send the pseudonym PSE that it has been provided e.g. by the HSS 15.
- Receiving 82, from the second network node 4, 14, a second pseudonym (a new pseudonym) associated with the mobile entity 6, 16 in response to the attachment request.

In an embodiment, the method 80 comprises receiving, from the second network node 4, 14, a request for the second pseudonym and sending, in response thereto, the second pseudonym to the second network node 4, 14. The mobile entity 6, 16 may create a link between a temporary identifier identifying the mobile entity 6, 16 and the second pseudonym.

Figure 12:
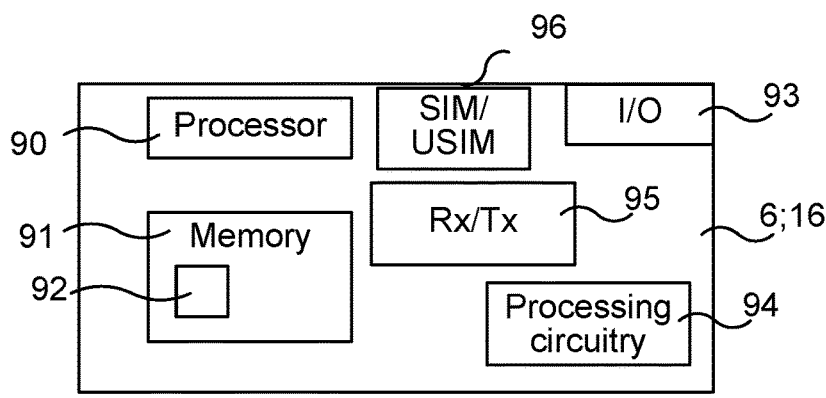
FIG. 12 illustrates schematically a mobile entity and means for implementing embodiments in accordance with the present teachings.

FIG. 12 illustrates schematically a mobile entity and means for implementing embodiments in accordance with the present teachings.

The mobile entity 6, 16 comprises a processor 90 comprising any combination of one or more of a central processing unit (CPU), multiprocessor, microcontroller, digital signal processor (DSP), application specific integrated circuit etc. capable of executing software instructions stored in a memory 91 which can thus be a computer program product 91. The processor 90 can be configured to execute any of the various embodiments of the method for instance as described in relation to FIG. 11.

The memory 91 can be any combination of read and write memory (RAM) and read only memory (ROM), Flash memory, magnetic tape, Compact Disc (CD)-ROM, digital versatile disc (DVD), Blu-ray disc etc. The memory 91 may also comprise persistent storage, which, for example, can be any single one or combination of magnetic memory, optical memory, solid state memory or even remotely mounted memory.

The mobile entity 6, 16 also comprises an input/output device 93 (indicated by I/O in FIG. 12) for communicating with other entities, e.g. with network nodes of the currently serving network 12 of the mobile entity 6, 16. Such input/output device 93 of the mobile entity 6, 16 may comprise a wireless communication interface, antennas, processing circuitry 95 and/or devices for reception and transmission of wireless signaling.

The mobile entity 6, 16 may comprise a subscriber identity module (SIM) 96, also denoted SIM card, or a USIM card, or any other type of card or device or software for accessing the communications network 1, 10.

The mobile entity 6, 16 may also comprise additional processing circuitry, schematically indicated at reference numeral 94, for implementing the various embodiments according to the present teachings.

The present teachings provide computer programs 92 for the mobile entity 6, 16. The computer programs 92 comprises computer program code, which, when executed on at least one processor 90 on the mobile entity 6, 16 causes mobile entity 6, 16 to perform the method 80 according to any of the described embodiments thereof.

The present disclosure also encompasses computer program products 91 comprising a computer program 92 for implementing the embodiments of the method as described, and a computer readable means on which the computer program 92 is stored. The computer program product 91 may, as mentioned earlier, be any combination of random access memory (RAM) or read only memory (ROM), Flash memory, magnetic tape, Compact Disc (CD)-ROM, digital versatile disc (DVD), Blu-ray disc etc.

A mobile entity 6, 16 is provided for use in a communications network 1, 10 for protecting confidentiality of a first identifier associated with a subscription used by the mobile entity 6, 16. The communications network 1, 10 comprises a home network 3, 13 of the mobile entity 6, 16 and a serving network 2, 12 serving the mobile entity 6, 16. The mobile entity 6, 16 is configured to:

send to a second network node 4, 14, which is part of the serving network 2, 4, 12, 14 an attachment request, the attachment request comprising a first pseudonym (an old pseudonym) previously generated for the mobile entity 6, 16 by a first network node 5, 15, which is part of the home network 3, 13 or the first identifier in encrypted format, encrypted in the mobile entity 6, 16, and receive, from the second network node 4, 14, a second pseudonym (a new pseudonym) associated with the mobile entity 6, 16 in response to the attachment request.

The mobile entity 6, 16 may be configured to perform the above steps e.g. by comprising one or more processors 90 and memory 91, the memory 91 containing instructions executable by the processor 90, whereby the mobile entity 6, 16 is operative to perform the steps.

In an embodiment, the mobile entity 6, 16 is configured to receive, from the second network node 4, 14, a request for the second pseudonym and sending, in response thereto, the second pseudonym to the second network node 4, 14.

Figure 13:
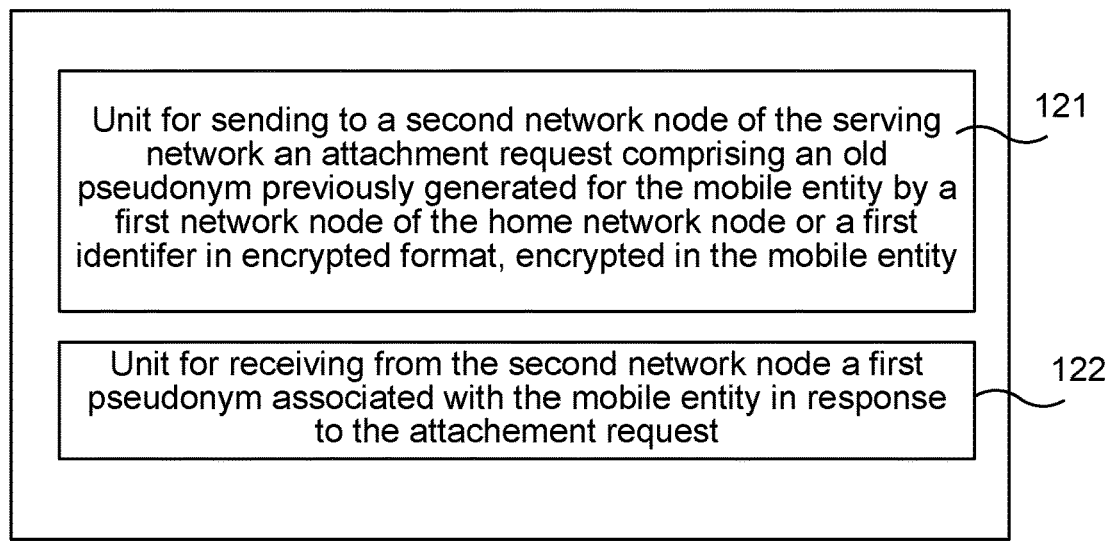
FIG. 13 illustrates a mobile entity comprising function modules/software modules for implementing embodiments of the present teachings.

FIG. 13 illustrates a mobile entity comprising function modules/software modules for implementing embodiments of the present teachings.

In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A mobile entity is provided for use in a communications network for protecting confidentiality of a first identifier associated with a subscription used by the mobile entity. The communications network comprises a home network of the mobile entity and a serving network serving the mobile entity. The mobile entity comprises a first unit 121 for sending to a second network node of the serving network an attachment request, the attachment request comprising a first pseudonym previously generated for the mobile entity by a first network node of the home network or the first identifier in encrypted format, encrypted in the mobile entity. Such first unit 121 may for instance comprise processing circuitry for sending such request.

The mobile entity comprises a second unit 122 for receiving, from the second network node, a second pseudonym associated with the mobile entity in response to the attachment request. Such second unit 122 may comprise various processing circuitry for receiving such pseudonym.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for a first network node of protecting confidentiality of a first identifier of a mobile entity, the first identifier associated by the first network node with a subscription used by the mobile entity in a communications network, the communications network comprising a home network of the mobile entity and a serving network serving the mobile entity wherein the home network and the serving network comprise different networks, the method comprising the following steps performed by the first network node, which is part of the home network:

receiving, from a second network node, which is part of the serving network, a first request for authentication information for the mobile entity, the first request comprising the first identifier, generating a first pseudonym associated with the first identifier, creating a link between the first pseudonym and the first identifier, and sending, to the second network node, the first pseudonym in response to the first request for authentication information for use as an identifier for the mobile entity in the serving network;

after receiving the first request, receiving, from the second network node, a second request for authentication information for the mobile entity, the second request comprising the first pseudonym associated with the first identifier, generating a second pseudonym associated with the first identifier, updating the link between the first pseudonym and the first identifier to a link between the second pseudonym and the first identifier, and sending, to the second network node, the second pseudonym in response to the second request for authentication information.

2. The method as claimed in claim 1, wherein the first identifier comprises a long-term identity associated with a subscription used by the mobile entity or a third pseudonym previously generated for the mobile entity.

3. The method as claimed in claim 1, wherein the first identifier comprises an identifier in encrypted format and wherein the receiving comprises receiving and decrypting the first identifier.

4. The method as claimed in claim 1, wherein the generating comprises selecting a random number or a pseudo random number, or applying a cryptographic function to a long-term identity associated with a subscription used by the mobile entity, wherein the cryptographic function comprises one of: encryption function, a hash function or a key derivation function.

5. A first network node for protecting confidentiality of a first identifier of a mobile entity, the first identifier associated by the first network node with a subscription used by the mobile entity in a communications network, the communications network comprising a home network of the mobile entity and a serving network serving the mobile entity wherein the home network and the serving network comprise different networks, the first network node, which is part of the home network and being configured to:

receive, from a second network node, which is part of the serving network, a first request for authentication information for the mobile entity, the first request comprising the first identifier, generate a first pseudonym associated with the mobile entity, create a link between the first pseudonym and the first identifier, and send, to the second network node, the first pseudonym in response to the first request for authentication information for use as an identifier for the mobile entity in the serving network after receiving the first request, receive, from the second network node, a second request for authentication information for the mobile entity, the second request comprising the first pseudonym associated with the first identifier, and generate a second pseudonym associated with the first identifier, update the link between the first pseudonym and the first identifier to a link between the second pseudonym and the first identifier, and send, to the second network node, the second pseudonym in response to the second request for authentication information.

6. The first network node as claimed in claim 5, wherein the first identifier comprises a long-term identity associated with a subscription used by the mobile entity or a third pseudonym previously generated for the mobile entity.

7. The first network node as claimed in claim 5, wherein the first identifier comprises an identifier, in encrypted format, wherein the first network node is configured to receive and decrypt the first identifier.

8. The first network node as claimed in claim 5, configured to generate by selecting a random number or a pseudo random number, or applying a cryptographic function to a long-term identity associated with a subscription used by the mobile entity, wherein the cryptographic function comprises one of: encryption function, a hash function or a key derivation function.

9. A method for a second network node of protecting confidentiality of a first identifier of a mobile entity, the first identifier associated by a first network node with a subscription used by the mobile entity in a communications network, the communications network comprising a home network of the mobile entity and a serving network serving the mobile entity wherein the home network and the serving network comprise different networks, the method comprising the following steps, performed by the second network node, which is part of the serving network:

sending, to the first network node, which is part of the home network, a first request for authentication information for the mobile entity, the first request comprising the first identifier, receiving, from the first network node, a first pseudonym associated with the first identifier in response to the first request, creating a link between a temporary identifier of the mobile entity and the first pseudonym, and using the first pseudonym as identifier of the mobile entity after receiving the first request, sending, to the first network node, which is part of the home network, a second request for authentication information for the mobile entity, the second request comprising the first pseudonym associated with the first identifier, receiving, from the first network node, a second pseudonym associated with the first identifier, updating the link between the first pseudonym and the first identifier to a link between the second pseudonym and the first identifier, and using the second pseudonym as identifier of the mobile entity.

10. The method as claimed in claim 9, comprising, prior to the sending, receiving from the mobile entity an attachment request comprising the first identifier, wherein the first identifier comprises an identifier in encrypted format, encrypted by the mobile entity.

11. The method as claimed in claim 9, comprising assigning the temporary identifier to the mobile entity.

12. The method as claimed in claim 9, comprising requesting, from the mobile entity, the first pseudonym in response to determining that the temporary identifier has been lost.

13. The method as claimed in claim 9, wherein the receiving comprises receiving the first pseudonym in encrypted format and the using comprises conveying the encrypted first pseudonym to the mobile entity for use in the authenticating of the mobile entity.

14. The method as claimed in claim 9, comprising:

receiving, from a third network node, which is part of a second serving network to which the mobile entity is to be handed over, a request for the first pseudonym, and sending, in response to the request, the first pseudonym to the third network node.

15. A second network node for protecting confidentiality of a first identifier of a mobile entity, the first identifier associated by a first network node with a subscription used by the mobile entity in a communications network, the communications network comprising a home network of the mobile entity and a serving network serving the mobile entity wherein the home network and the serving network comprise different networks, the second network node, which is part of the serving network and being configured to:

send, to the first network node, which is part of the home network, a first request for authentication information for the mobile entity, the first request comprising the first identifier, receive, from the first network node, a first pseudonym associated with the first identifier in response to the first request, create a link between a temporary identifier of the mobile entity and the first pseudonym, and use the first pseudonym as identifier of the mobile entity;

after receiving the first request, send, to the first network node, which is part of the home network, a second request for authentication information for the mobile entity, the second request comprising the first pseudonym associated with the first identifier, receive, from the first network node, a second pseudonym associated with the first identifier, update the link between the first pseudonym and the first identifier to a link between the second pseudonym and the first identifier, and use the second pseudonym as identifier of the mobile entity.

16. The second network node as claimed in claim 15, configured to, prior to the sending, receive from the mobile entity an attachment request comprising the first identifier, wherein the first identifier comprises an identifier in encrypted format, encrypted by the mobile entity.

17. The second network node as claimed in claim 15, configured to assign the temporary identifier to the mobile entity.

18. The second network node as claimed in claim 15, configured to request, from the mobile entity, the first pseudonym in response to determining that the temporary identifier has been lost.

19. The second network node as claimed in claim 15, configured to receive by receiving the first pseudonym encrypted and configured to use by conveying the encrypted first pseudonym to the mobile entity for use in the authenticating of the mobile entity.

20. The second network node as claimed in claim 15, configured to:
    receive, from third network node, which is part of a second serving network to which the mobile entity is to be handed over, a request for the first pseudonym, and
    send, in response to the request, the first pseudonym to the third network node.

\* \* \* \* \*